United States Patent Office.

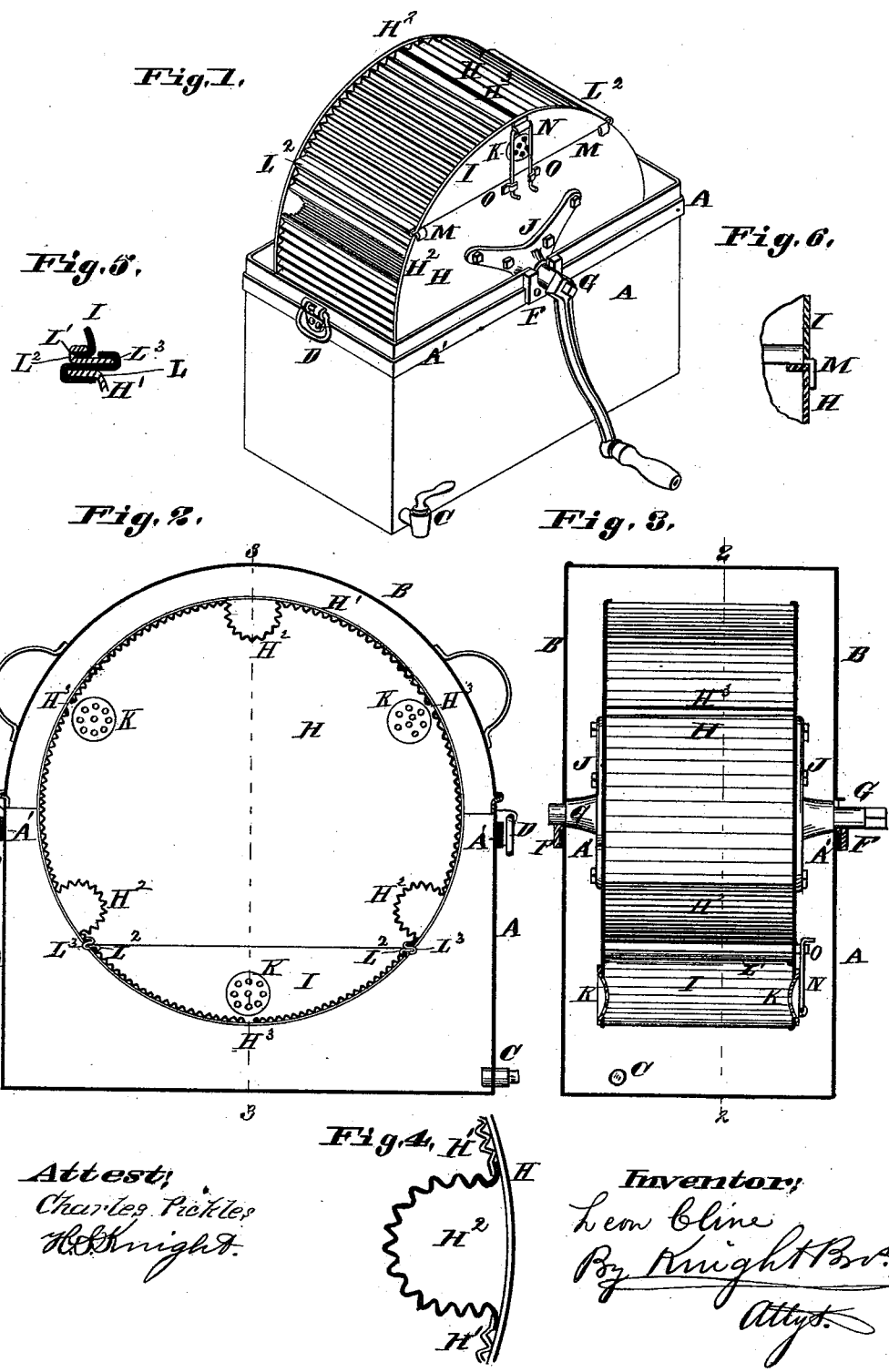

LEON CLINE, OF ST. LOUIS, MISSOURI.

WASHING-MACHINE.

SPECIFICATION forming part of Letters Patent No. 338,714, dated March 30, 1886.

Application filed August 19, 1884. Serial No. 140,950. (No model.)

*To all whom it may concern:*

Be it known that I, LEON CLINE, of the city of St. Louis, and State of Missouri, have invented a certain new and useful Improvement in Washing-Machines, of which the following is a full, clear, and exact description, reference being had to the accompanying drawings, forming part of this specification.

The invention relates to the class of washing-machines having a clothes-cylinder which is revolved in a closed vessel containing hot water.

My invention consists in the described manner of constructing and supporting the cylinder, as hereinafter described, and pointed out in the claims.

Figure 1 is a perspective view of the machine, the lid of the outer vessel being omitted. Fig. 2 is a longitudinal, and Fig. 3 a transverse, section of the machine at 2 2 and 3 3, respectively. Fig. 4 is an enlarged detail section of one of the ribs by which the clothes are turned. Figs. 5 and 6 are enlarged detail sections illustrating the construction of the joint between the body and lid of the cylinder.

The outer vessel consists of a bottom section or body, A, and a lid, B, fitting thereon with a snug joint, so as to check the escape of steam. This vessel has a cock, C, for the escape of dirty suds. D are handles by which it may be lifted, only one being shown in Fig. 1.

The vessel will be made of sheet metal. I prefer to strengthen it near the top by an external metal loop or rib, A'. The handles D are secured to this rib, and also the journal-boxes F, in which the gudgeons G of the cylinder turn.

The cylinder consists of end plates, H, corrugated periphery H', and a lid, I, the lid forming part of the cylinder, and the lid and the cylinder being fitted together with a slide-joint.

The gudgeons G are secured to the body by means of stars J, riveted or bolted to the flat ends of the cylinder.

The periphery H' of the cylinder is corrugated, as described, in the application, Serial No. 121,829, to give strength to the periphery and effective rubbing action upon the clothes.

At $H^2$ are ribs formed by bending the periphery inward, thus forming recesses upon the outside. Between these recesses are slots, as seen at $H^3$, through which the water can circulate between the outer vessel and the interior of the cylinder. The water has passage also through the perforations in the ends shown at K.

The lid I forms a segment of the cylinder, is entirely removable from the body, and is fitted to the body with a slide-joint, the periphery of the cylinder at the body portion being made with outturned lips L, and the lid being made with outturned lips L', the lid-lips having hooked strips $L^2$ and the body-lips having double-hooked pieces $L^3$, by which the slide-joint is made and the lid secured to the body, the lid sliding endwise into position.

M are ears upon the lid, which come in contact with the body when the lid reaches its place.

N is a spring-catch, which is hinged to the lid, and whose ends spring outward into the holders O upon the body, and thus retain the lid in place.

In Fig. 1 the cylinder is shown in the position for the putting in or removal of clothes, while in Figs. 2 and 3, it is in position it occupies when the clothes are becoming heated and moistened, the water entering the cylinder through the slot $H^3$ of the lid and the holes K in proximity to it.

I claim—

1. A revolving clothes-cylinder having end plates and a periphery formed with a removable lid, the lid comprising a segment of the periphery and end plates, the lid being connected to the body portion by means of interlocking strips secured to the body portion of the periphery and the lid portion thereof, substantially as set forth.

2. A revolving clothes-cylinder comprising end plates, H H, corrugated periphery H', formed with corrugated ribs $H^2$ and spaces $H^3$, between the ribs, the cylinder having a removable portion, I, connected by interlocking strips, and the side plates being formed with perforations between the ribs at each end of the spaces, substantially as set forth.

LEON CLINE.

Witnesses:
SAML. KNIGHT,
GEO. H. KNIGHT.